United States Patent [19]
Marusinec et al.

[11] Patent Number: 5,889,231
[45] Date of Patent: Mar. 30, 1999

[54] TRANSFORMER PAD WITH MOLDED SILL AND PEDESTAL

[75] Inventors: Richard Michael Marusinec, Delafield; Gregg A. Bott, Wauwatosa; Neal Dirk, Whitefish Bay; Ali Asghar Ghafourian; Randal V. Malliet, both of Waukesha, all of Wis.

[73] Assignee: Cooper Industries, Inc., Houston, Tex.

[21] Appl. No.: 866,721

[22] Filed: May 30, 1997

[51] Int. Cl.⁶ .................................................... H05K 5/04
[52] U.S. Cl. ............................ 174/50; 174/52.1; 220/3.8
[58] Field of Search ................... 174/50, 52.1, 1, 174/37; 220/3.8; 336/65

[56] References Cited

U.S. PATENT DOCUMENTS

| | | | |
|---|---|---|---|
| 3,014,158 | 12/1961 | Nelson et al. | 361/41 |
| 3,636,489 | 1/1972 | Colangelo et al. | 336/94 |
| 3,870,932 | 3/1975 | Broverman | 361/268 |
| 3,962,660 | 6/1976 | Duckett | 336/65 |
| 4,023,755 | 5/1977 | Alesi, Jr. | 248/678 |
| 4,050,659 | 9/1977 | McCannon et al. | 248/636 |
| 4,056,251 | 11/1977 | Dixon et al. | 248/678 |
| 4,212,446 | 7/1980 | Domanick et al. | 248/678 |
| 4,267,399 | 5/1981 | Lux, Jr. | 174/1 |
| 4,505,449 | 3/1985 | Turner et al. | 248/669 |
| 4,533,786 | 8/1985 | Borgmeyer et al. | 174/50 |
| 4,869,456 | 9/1989 | Jacobs | 248/678 |
| 4,946,725 | 8/1990 | Harlan | 428/73 |
| 5,527,988 | 6/1996 | Hernandez et al. | 174/17 LF |
| 5,686,696 | 11/1997 | Baker, Jr. et al. | 174/50 |

*Primary Examiner*—Nestor Ramirez
*Assistant Examiner*—Joseph Waks
*Attorney, Agent, or Firm*—Burns, Doane, Swecker & Mathis, L.L.P.

[57] ABSTRACT

A pad for supporting a transformer is described, which comprises: a molded polymer body having front, rear, left and right surfaces, canted top surfaces, a sill adapted to engage a transformer cabinet door, and a pedestal to support and elevate a transformer tank. In one embodiment, the sill is formed integrally with the body, the sill being generally U-shaped, including a front section and left and right side sections and extending between about 0.5 and 6 inches above said top surface of the body. The pedestal may also be formed integrally with the body, the pedestal being generally rectangular in shape, incorporating transformer mounting flanges, and extending between about 0.5 and 6 inches above said top surface of said body. The body includes a first opening inside of the sill capable of allowing the passage therethrough of electrical cables for connecting the transformer, a second opening sized to provide drainage for a portion of said canted surface that is under the transformer and within the boundaries of the pedestal when the transformer is in place on said pad, and canted surfaces surrounding the sill and pedestal that provide drainage off of the exposed top surfaces of said pad.

37 Claims, 12 Drawing Sheets

TRANSFORMER PAD WITH MOLDED SILL AND PEDESTAL

TECHNICAL FIELD OF THE INVENTION

This invention relates to enclosures for electrical equipment, and more specifically, to enclosures for transformers of the padmount type. Still more particularly, the present invention comprises a transformer pad formed of molded polymer resin and having integral transformer tank pedestal and cabinet sill formed therein which could be employed individually or in combination. The cabinet sill incorporates a locking device and both cabinet sill and tank pedestal incorporate reinforcing members. Furthermore, the transformer pad has canted surfaces for drainage.

BACKGROUND OF THE INVENTION

In electrical power distribution systems, distribution transformers are used to step down voltage between the high voltage power line and the user. Hence, transformers are present at virtually every distribution point. Transformers are typically mounted above ground on a junction pole, or at ground level on a pad or platform. Increased use of underground power distribution systems has resulted in a corresponding increase in the number of padmounted transformers. The electrical connections between padmounted transformers and the power distribution system must be contained in a manner that will prevent tampering by unauthorized individuals. Typically, this is accomplished by enclosing the transformer connections within a metal cabinet. Hence conventional transformers include a tank, which contains the core and coil assembly immersed in oil, and a cabinet enclosing the front of the tank. Connections for incorporating the transformer into the power distribution system extend through the front plate of the tank and are enclosed by the cabinet. The cabinet typically includes a door hingedly attached to the tank and a sill, or riser, that extends forward from the front plate of the tank and is in contact with the pad. Typically, the tank front plate is attached to the transformer pad. The sill is typically attached to the tank front plate and transformer pad and provides support for the cabinet door when closed as well as supporting a latch and/or lock for retaining the cabinet door in its closed position. The sill further serves to exclude some insects, small animals and moisture from the inside of the cabinet. However, because the sill is bolted to the pad, there is always some clearance between the sill and pad through which insects and moisture can find ingress.

Typically, transformer pads are fabricated from concrete, fiberglass or plastic. Concrete pads can be poured in place, or preassembled off-site. In addition to being heavy and relatively difficult to transport, an additional assembly step is required at the transformer site, wherein the transformer tank and the sill are affixed to the transformer pad. This assembly step takes time and may result in paint damage to the various parts of the transformer enclosure that come in contact with or are being affixed to the transformer pad. Paint damage is undesirable in transformer enclosures, as they are typically exposed to the elements and paint damage can result in increased corrosion.

Similarly, the cabinet sill is conventionally a separately fabricated piece from the rest of the transformer, i.e. the transformer tank and the cabinet door. Therefore, the sill must be affixed to the front plate of the transformer tank, as well as to the transformer pad. This step also requires additional labor and may result in paint damage to the sill itself, the tank or the door.

Transformer pads typically have predominantly planar upper surfaces. Some pads incorporate ridges and raised bosses on the top surface to facilitate location, placement, and attachment of the transformer on the pad and to provide a degree of tamper resistance. Ridges are typically located inside the transformer sill walls. Cabinet doors close over the top of the ridges to prevent the accumulation and containment of potentially corrosive liquids and airborne particles. Placement of the ridges inside the sill walls also provides an obstacle to objects inserted between the walls and pad and intruding into the transformer interior. The degree to which the ridges succeed as a barrier to intrusion is dependent on the flexibility of the inserted object. A flexible object might bend and skate around the ridges.

When installed, transformer pads are typically flush or very close to flush with ground level. Often the pads become buried after installation. The placement of the pad at ground level or below-grade allows the accumulation of chemicals and liquids, which causes corrosion at the base of the transformer enclosure. Ground level corrosion of the sill and tank is frequently accelerated by paint damage caused by yard care tools and equipment.

Recently, pads for transformers, switch boxes, junction boxes and the like have been developed that are lighter and easier to transport. These may be formed of plastic or fiberglass, and may include a foam core or other internal structural members. Although these pads are more easily installed at the pad site than concrete pads, they still require the additional assembly step wherein the cabinet sill is attached to the transformer tank and pad, and the pads still become buried. Hence, it is desired to provide a transformer pad that eliminates some of the assembly steps for a transformer enclosure by reducing the number of parts required. It is further desired to provide a transformer enclosure having enhanced corrosion resistance and increased resistance to tampering. It is further desired to provide a transformer with a pad that is easily transported and installed at the power distribution site.

SUMMARY OF THE INVENTION

The present invention comprises an improved transformer pad having molded integral cabinet sill and transformer tank pedestal formed therein which could be employed individually or in combination. The cabinet sill incorporates a locking device and both cabinet sill and tank pedestal incorporate reinforcing members. Furthermore, the transformer pad has canted surfaces for drainage. According to the preferred embodiment, a conventional latch mechanism is employed. A conventional floating screw in the cover mates with a threaded post and hasp molded into the sill. Typically, the threaded post and hasp float when mounted in a metal sill. Because of the stationary nature of the molded-in post and hasp, the floating screw clearance hole in the cover may be slightly enlarged to allow sufficient freedom for the screw to mate with the post. Any other modification to the cover would be minor in nature and would be readily understood by those skilled in the art.

This invention increases tamper resistance by eliminating the interface between the cabinet sill and the transformer pad, thereby preventing the insertion of objects into the transformer cabinet. Corrosion resistance is increased by substituting a plastic sill for a metal sill, by raising the base of the transformer tank above ground level with a molded pedestal, and by draining corrosive fluids and particles off of the pad via the canted top surfaces. Paint damage is decreased and corrosion resistance improved through the elimination of metal to metal contact between the sill and door and sill and tank front plate, by elevation of the transformer tank on the pedestal, and by elimination of metal to concrete contact with the substitution of a polymer material for concrete. By forming the transformer pad of molded polymer, it is possible to construct a transformer pad that is light and easily transported. With proper material selection and structural design, a molded polymer pad is tough and resilient enough to perform the support functions required of a conventional transformer pad.

Alternate embodiments of this invention define a detachable pedestal and a detachable pedestal with sill. These embodiments provide many of the same benefits as a molded polymeric pad with integral sill and pedestal. Namely, corrosion resistance is increased by substituting components made of corrosion resistant materials for metal components, by elevating the metal components still used in the transformer several inches above ground level corrosives, and by reducing paint damage due to metal to metal contact between the cabinet door and sill. If used with a concrete transformer pad, the detachable pedestal and sill reduce paint damage by eliminating metal to concrete contact between the transformer and pad.

Other objects and advantages of the invention will appear from the following description.

BRIEF DESCRIPTION OF THE DRAWINGS

For a detailed description of a preferred embodiment of the invention, reference will now be made to the accompanying drawings wherein.

DETAILED DESCRIPTION OF THE INVENTION

Figure 1:
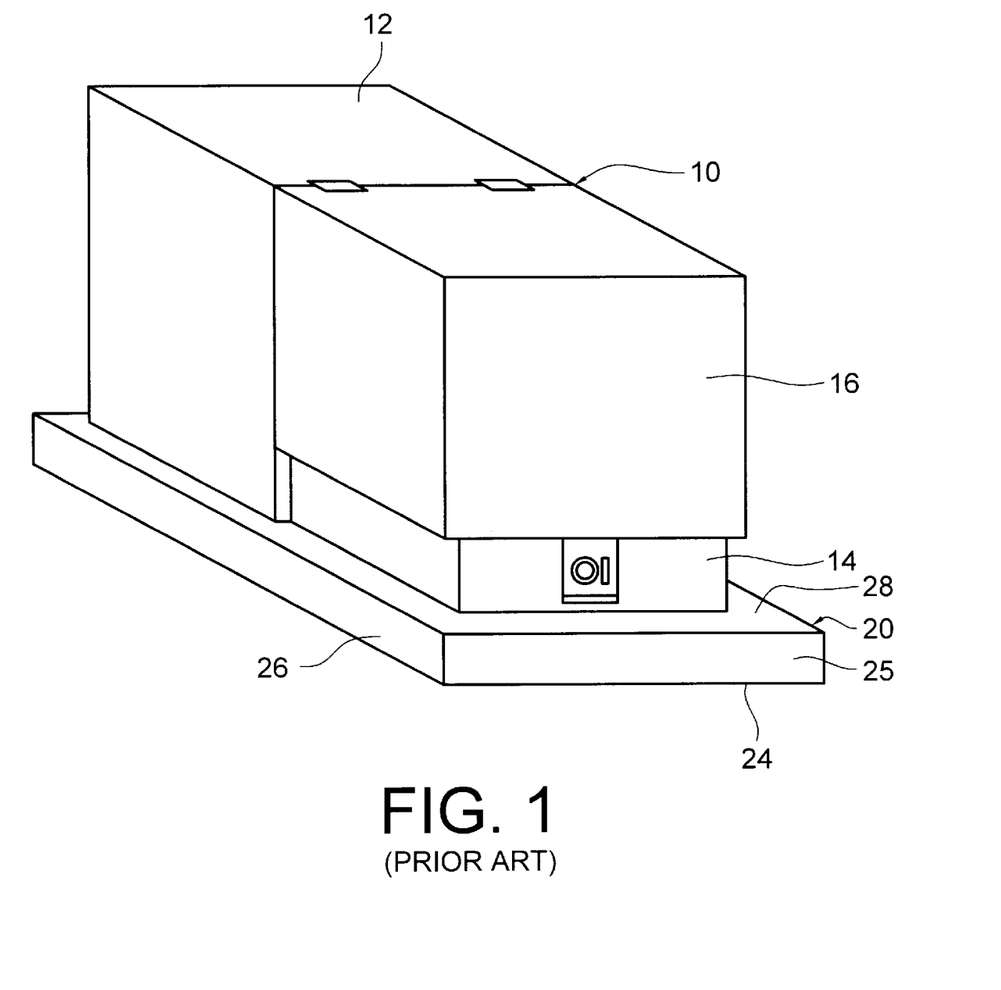
FIG. 1 is a perspective view of a transformer on a transformer pad.

Referring initially to FIG. 1, transformer 10 is bolted to a transformer pad 20. Transformer 10 includes a tank 12 from which a sill 14 extends. A door 16 is hingedly attached to tank 12 along its top rear edge such that when closed, door 16 rests on sill 14. Door 16 serves to enclose electrical connections (not shown) extending through the front plate (not shown) of the tank 12 that connect the transformer 10 to an underground distribution system, as is well known in the art. In conventional usage, both the transformer tank 12 and sill 14 are made of metal and are anchored to the upper surface of the pad. The transformer tank 12, having a raised bottom plate (not shown) contacts the pad 20 along the lower edges of the front plate and outside walls of the tank. Pad 20 typically includes a lower surface 24, front surface 25, side surfaces 26 and upper surface 28.

Figure 1A:
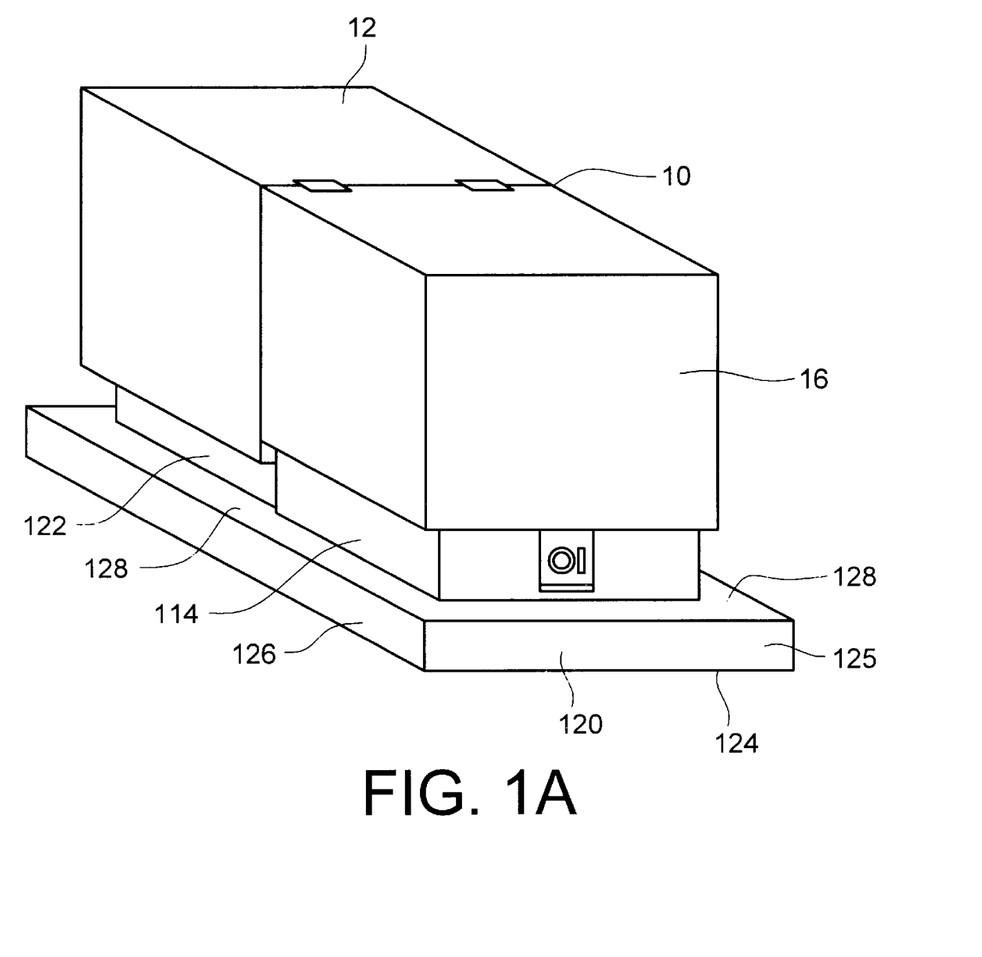
FIG. 1A is perspective view of a transformer on a transformer pad with integral sill and pedestal according to one embodiment of the present invention.
Figure 2:
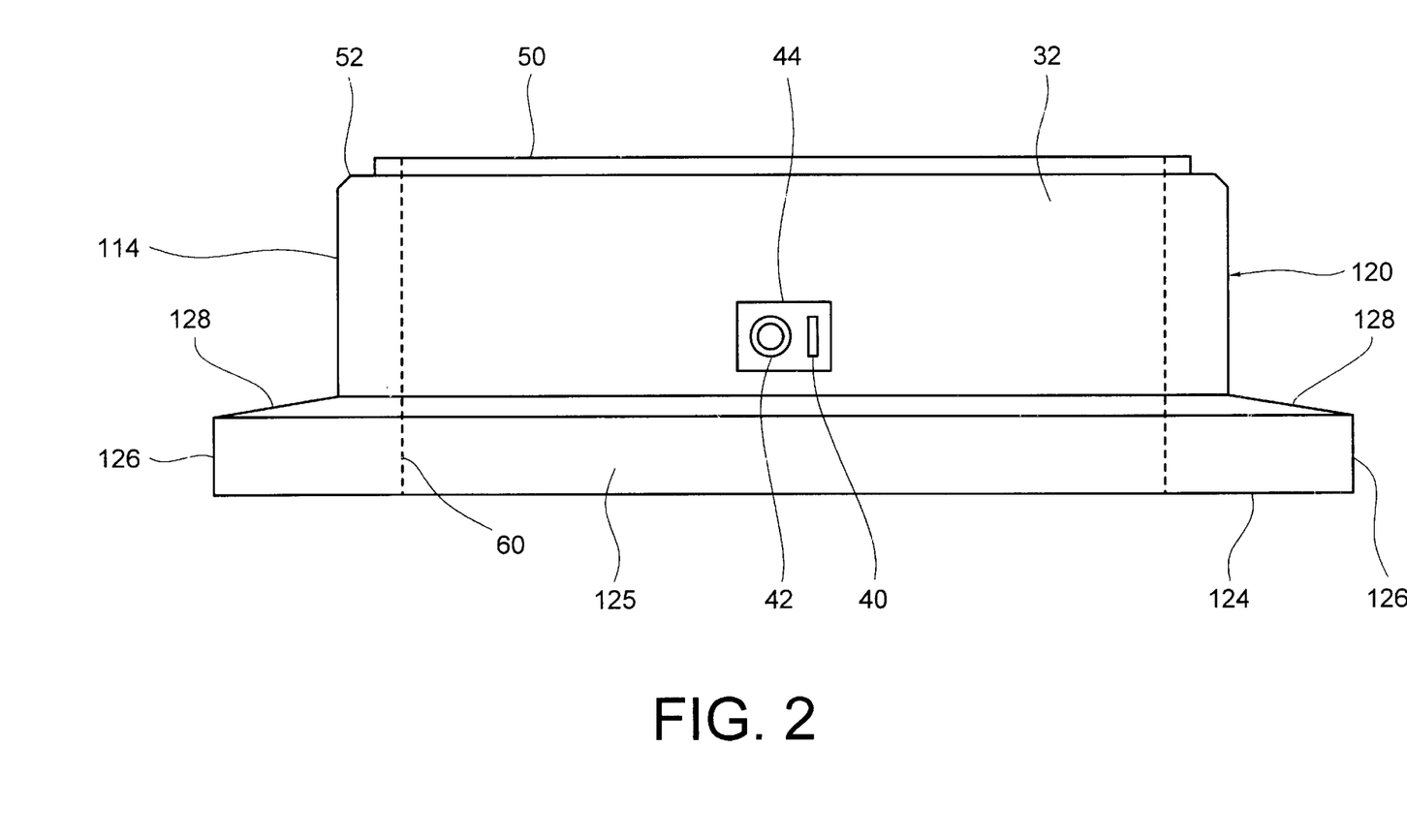
FIG. 2 is a front elevation of the transformer pad of FIG. 1A.
Figure 3:
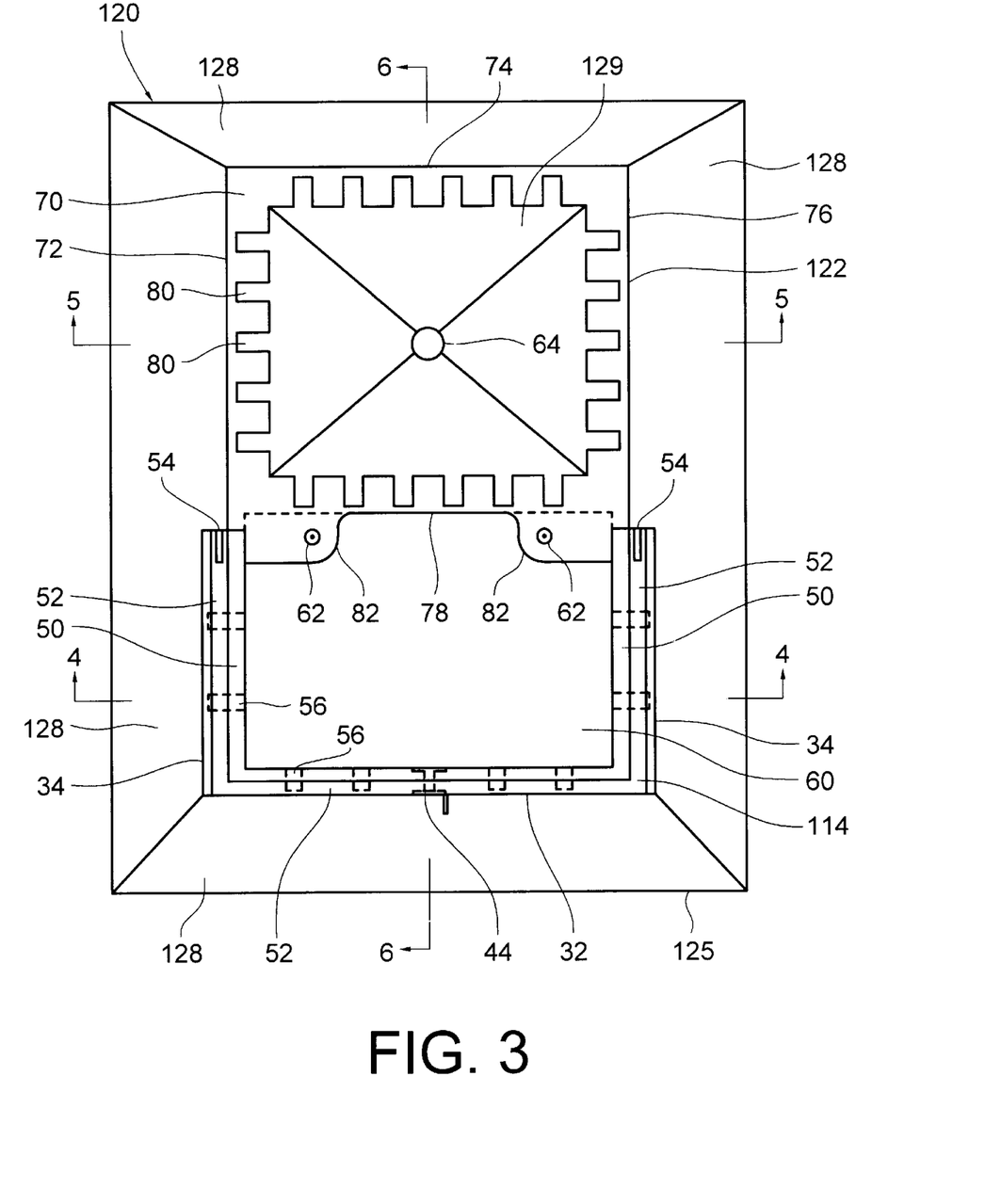
FIG. 3 is a plan view of the transformer pad of FIG. 1A.
Figure 7:
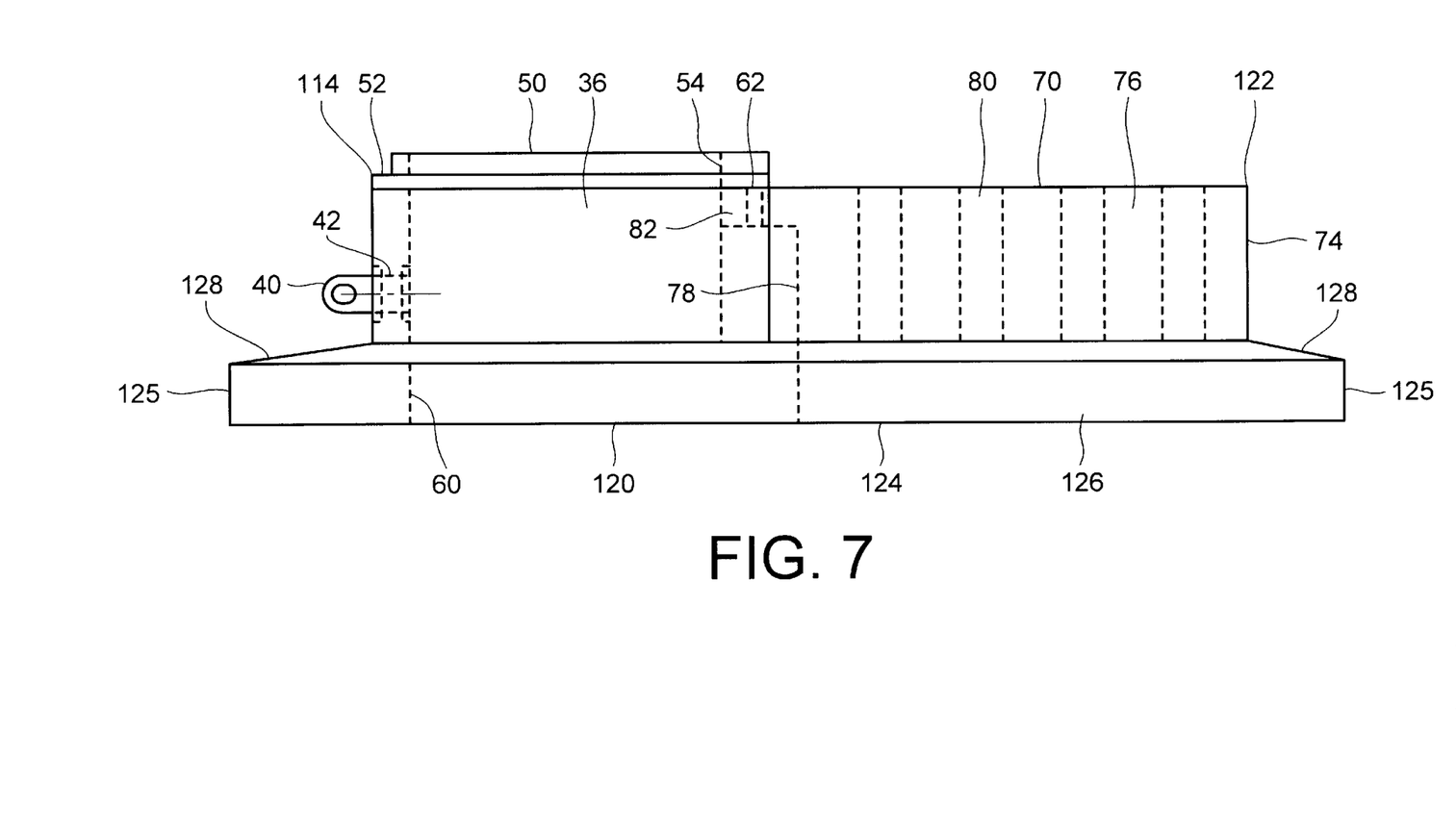
FIG. 7 is a side elevation of the transformer pad of FIG. 1A.

Referring now to FIG. 1A, a transformer 10 is shown attached to a preferred embodiment of transformer pad 120. Pad 120 includes an integrally formed or molded pedestal 122 and integrally formed or molded sill 114. As shown in FIGS. 2, 3, and 7, transformer pad 120 includes a lower surface 124, front and rear surfaces 125, side surfaces 126, peripheral top or upper surfaces 128, and internal canted surfaces 129 (described in detail below). The pedestal 122 serves to raise the transformer tank 12 above the top or upper surface of the transformer pad 120. Upper surfaces 128 may be canted and pitched downward away from the sill 114 and pedestal 122 and extend to the outer perimeter of the pad 120 so as to drain potentially corrosive liquids and particles away from the transformer and off the sides of the pad (as shown in FIG. 2). Canted surfaces 129 are pitched downward away from pedestal 122, so as to drain condensation away from the transformer tank 12 and out through hole 64. Integral sill 114 eliminates the need to attach a separate sill to the pad.

As best shown in FIGS. 2, 3 and 7, integral sill 114 is generally U-shaped and includes a front section 32 and a pair of identical side sections 34, 36 extending perpendicularly therefrom. Side sections 34, 36 are molded integrally with front section 32 and the rest of the pad 120. Additionally, various reinforcements, such as sheet metal, thin stainless steel, galvanized steel or the like, (not shown) can be incorporated into the molded sill to further strengthen it against vandalism. This anti-vandalism reinforcement is preferably molded into the sill during manufacture. Alternatively, the reinforcements can be formed separately from the sill and mechanically attached to the interior sill walls 32, 34, 36.

Figure 8:
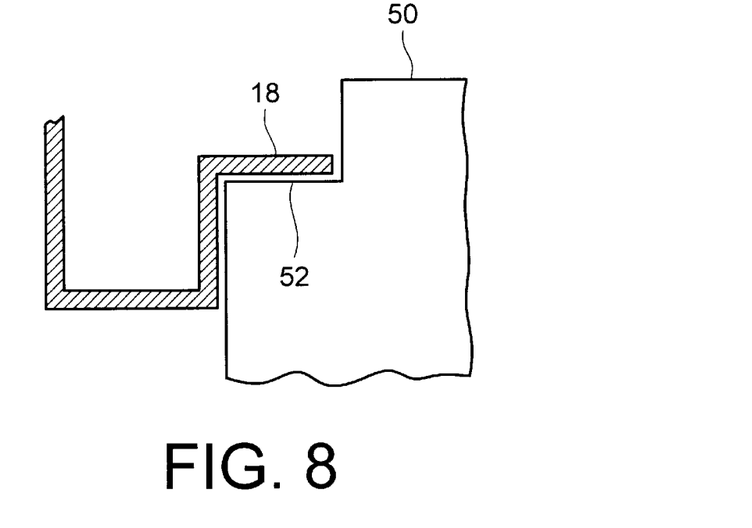
FIG. 8 is an enlarged cross-section showing the interface between the cabinet door and the front of the sill.

As shown in FIGS. 3, 7 and 8, a wall 50 defines an adjacent shoulder 52 along the tops of front section 32 and side sections 34, 36. Wall 50 and shoulder 52 provide an interface with the cabinet door that does not tend to catch and hold contaminants and moisture, resulting in corrosion of the door. As best shown in FIG. 8, shoulder 52 is preferably configured so as to receive the inside of lower edge 18 of the cabinet door 16 thereon when the door is in its closed position. Wall 50, shoulder 52 and inside lower door edge 18 form a tortuous path along the interface between door 16 and sill 114, so as to prevent the insertion of wire, pry bars or other foreign objects into the transformer along this interface.

According to a preferred embodiment of the present invention, pad 120 is formed of a molded polymer resin, such as polyethylene molded by the rotational molding process. Other processes such as injection or compression molding, blow molding, or thermoforming could be employed to mold or form pads. Likewise, materials other than polyethylene that are appropriate to those processes can be used, so long as they are appropriate to the present application. As known by those skilled in plastic molding, the rotational molding process produces a hollow part. For this reason, large unsupported surfaces may be subject to breakage when struck with extreme force. To prevent impact breakage of the sill 114, it is preferred that inside walls of front and side sections 32, 34, 36 include inwardly molded ribs 56 (FIG. 3) that adjoin and support the outside walls of the side sections. The external surfaces of side sections 32, 34, 36 are preferably relatively flat, as opposed to the ribbed inner surface, so as not to provide pockets that could invite damage by yard tools and equipment or promote the accumulation of corrosive liquids or particles.

As best shown in FIGS. 3 and 7, the back end of each side section 34, 36 includes a vertical molded slot 54 extending downward through the shoulders 52. The molded slots 54 provide recesses that are adapted to receive corresponding flanges extending from the front plate of tank 12. The engagement of the flanges with slots 54 provides alignment of the front of the tank 12 with respect to the sill 114 and provides a barrier to the insertion of wire, pry bars or other foreign objects into the transformer cabinet along this interface.

The height of sill 114 is preferably between 0.5 and 6 inches and more preferably at least about 3 inches. If sill 114 is too short, it will not be an adequate barrier against the entry of water into the cabinet and will not adequately protect the cabinet door. If sill 114 is too tall, it will impede manual access to the frontplate of the tank and to the inside of the cabinet for the electrician or serviceman.

Figure 4:
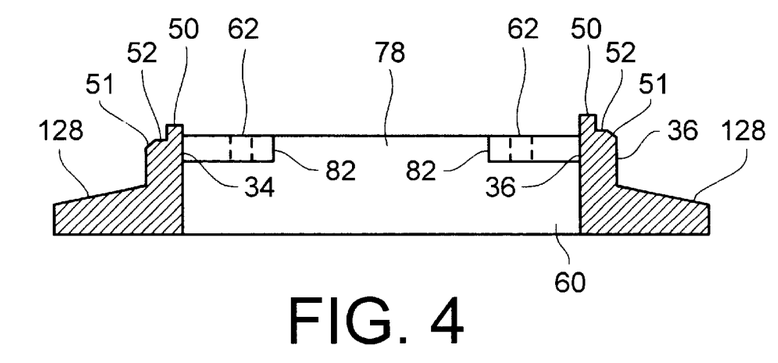
FIG. 4 is a cross-sectional view taken along the lines 4—4 in FIG. 3.
Figure 5:
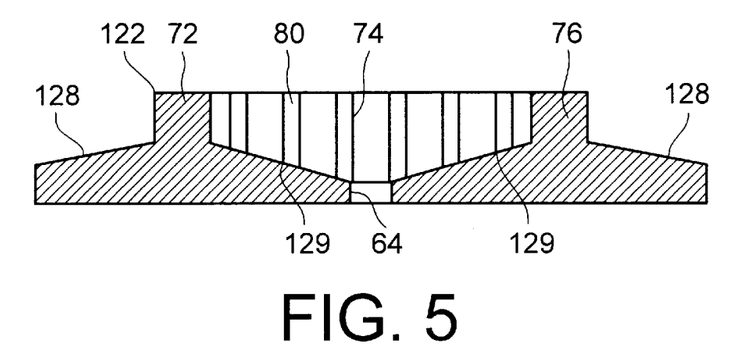
FIG. 5 is a cross-sectional view taken along the lines 5—5 in FIG. 3.
Figure 6:
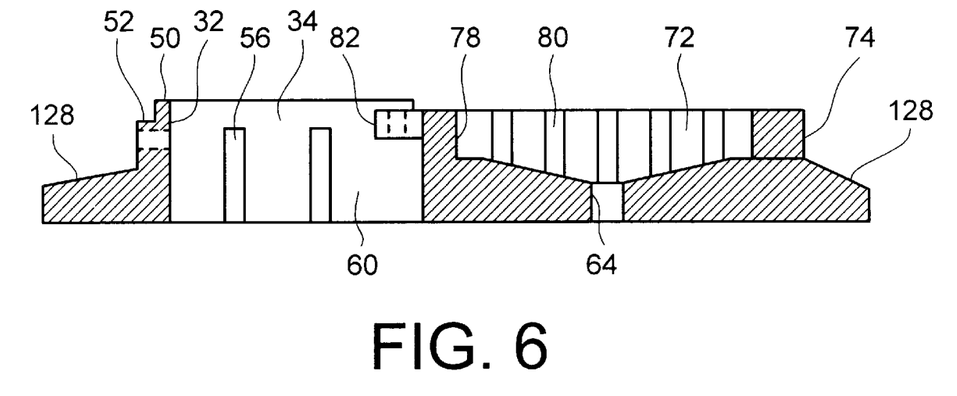
FIG. 6 is a cross-sectional view taken along the lines 6—6 in FIG. 3.

Referring now to FIGS. 3, 4 and 6, the body of transformer pad 120 includes an opening 60 therethrough, which is sized and adapted to allow electrical cables extending from an underground power distribution system to enter the transformer cabinet and connect to the transformer itself via connections in the front plate of the tank, as is known in the art.

Referring again to FIGS. 2, 3 and 7, the front section 32 of sill 114 preferably includes a locking device 44. According to a preferred embodiment of the present invention, the locking device 44 is fabricated from steel strip and round steel bar, which are machined and welded together to form a locking assembly. Alternatively, the locking device 44 can be cast as a single complete part incorporating all of the features of the welded assembly. As shown, the locking device is molded into the sill. The locking device 44 incorporates an internally threaded post 42 and a protruding hasp 40 as typically used to afford latching and locking of door 16 in its closed position.

Figure 9A:
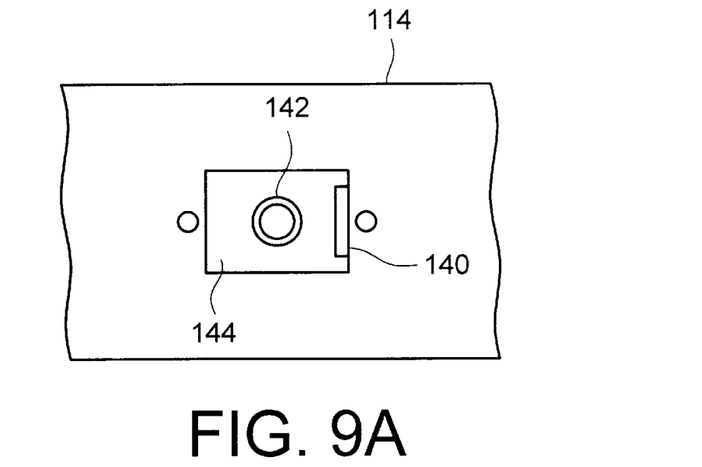
FIGS. 9A–B are front and top views, respectively, showing a first alternative embodiment of the locking mechanism mounted in the sill.
Figure 9B:
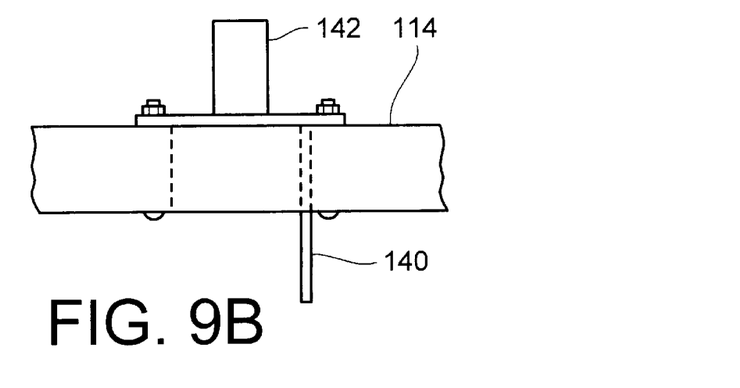
Figure 10A:
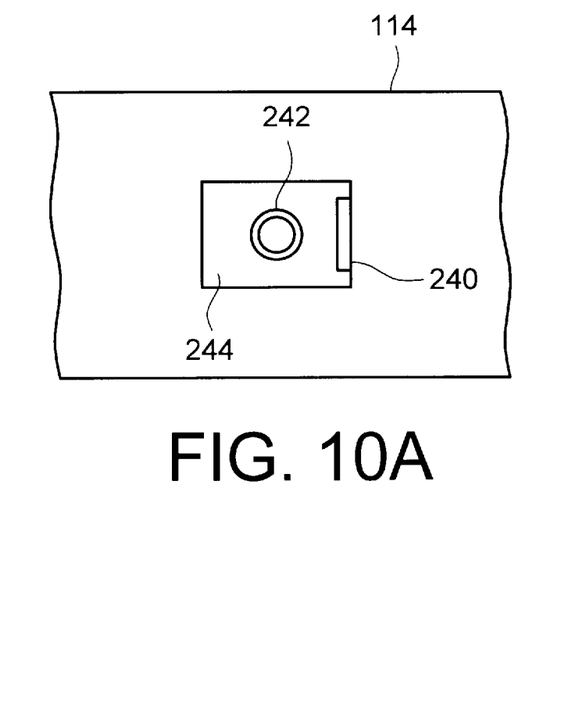
FIGS. 10A–B are front and top views, respectively, showing a second alternative embodiment of the locking mechanism mounted in the sill.
Figure 10B:
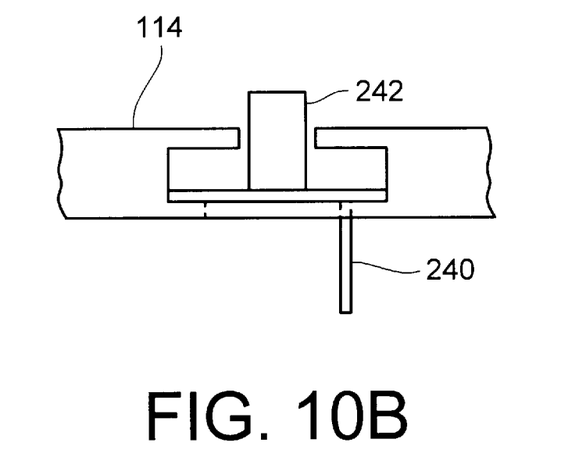

FIGS. 9A and 9B show a first alternative embodiment wherein the locking device is mechanically fastened to sill 114 with carriage bolts and associated hardware. A window is molded into the sill 114 which allows hasp 140 to protrude and provides access to the internally threaded post 142. FIGS.10A and 10B show a second alternative embodiment wherein the locking device is inserted into and floats in a pocket molded in sill 114. A window is again molded into the sill, which allows hasp 240 to protrude and provides access to the internally threaded post 242.

Referring now to FIGS. 3 and 7, pedestal 122 is generally rectangular shaped and comprises two pairs of substantially parallel side sections 72, 74, 76, 78. Side sections 72, 74, 76 and 78 define a single, flat pedestal surface 70 which is parallel to the lower surface 124. Pedestal surface 70 is sized and adapted to receive thereon the bottom plate (not shown) of a transformer tank 12, thereby supporting the tank on pad 120 while elevating it above the level of many corrosive substances. According to the preferred embodiment, internal surfaces of side sections 72, 74, 76, 78 each incorporate inwardly molded ribs or depressions 80, which increase the strength of each section and thereby provide greater support for the transformer tank 12. In alternative embodiments, various other types of reinforcements (not shown) such as sheet metal, wood, structural foam, molded polymer or the like can be used alone or in conjunction with molded ribs. Preferably, these reinforcements are molded into the pedestal 122. Alternatively, the reinforcements can be formed separately from the pedestal and placed within the inner periphery of the pedestal side sections 72, 74, 76, 78 and under the transformer tank 12.

As with the exterior of sill 114, it is preferred that the exterior of pedestal 122, be relatively flat as opposed to the ribbed inner surface, so as not to provide pockets that could invite damage by yard tools and equipment or promote the accumulation of corrosive liquids or particles. The height of the pedestal 122 is preferably between 0.5 inches and 6.0 inches and more preferably between 2 and 6 inches. If pedestal 122 is too short, it will not elevate the transformer tank enough above ground to significantly reduce transformer tank wall corrosion.

Figure 11:
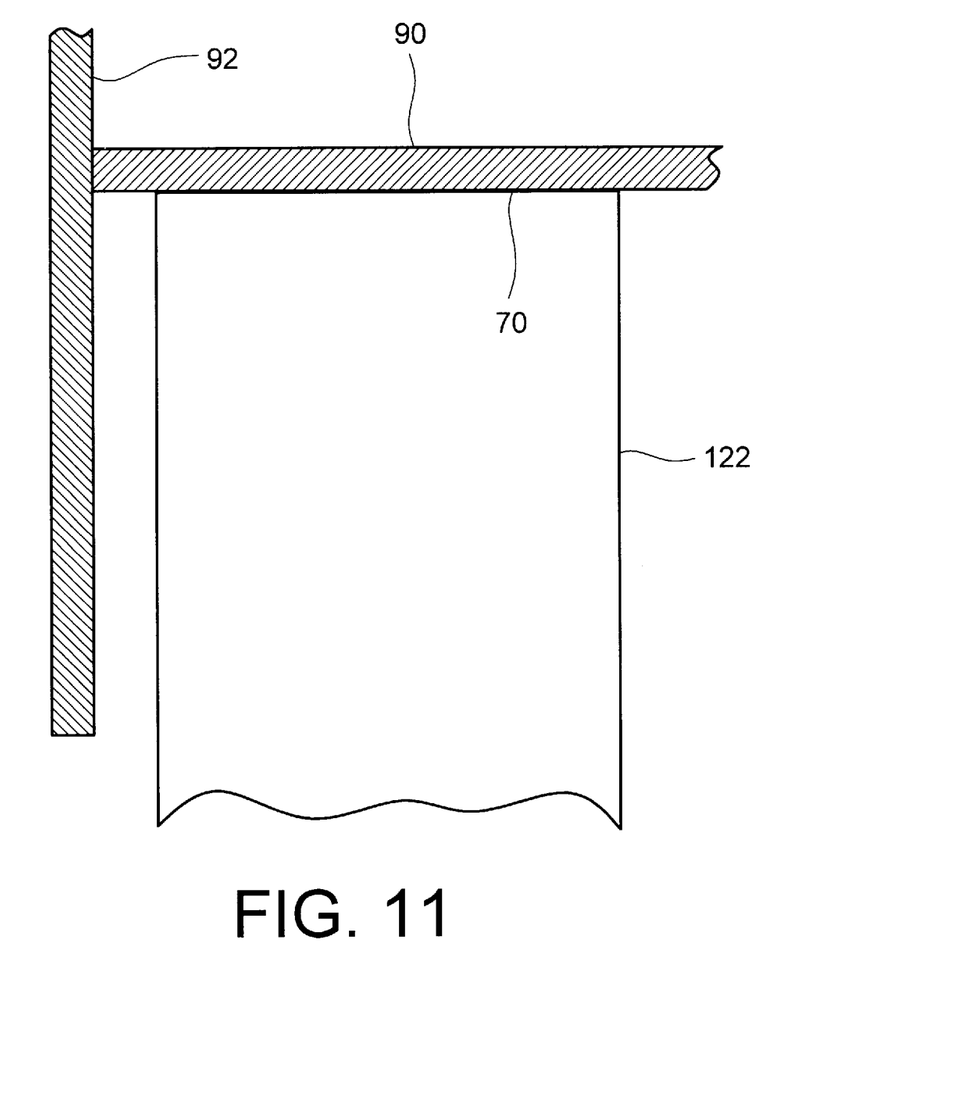
FIG. 11 is an enlarged cross-section showing the transformer tank supported by the pedestal.

A preferred feature of the pedestal is shown in FIG. 11. In FIG. 11, a transformer tank bottom 90 is shown resting on the top of pedestal 122, while walls 92 of the tank extend down over the outside of pedestal 122. The outside periphery of the pedestal is smaller than the transformer tank so that the pedestal surface 70 supports the bottom plate 90 in the area within the surrounding tank walls 92. This configuration allows the entire pedestal surface 70 to contact the bottom plate 90, thereby improving support of the tank by distributing the weight load over a greater surface area. Additionally, the tank bottom plate 90 and walls 92 shield the pedestal, thereby preventing the accumulation of corrosive liquids or particles on the pedestal surface 70.

Referring again to FIGS. 3 and 7, the pedestal side section 78 that faces opening 60 incorporates a pair of flanges 82 with holes 62 molded therethrough. The transformer 10 is attached to pad 120 in a conventional manner, namely, using machine screws and associated hardware installed through holes 62 in the pad and brackets at the lower edge of the tank front plate. By latching and locking door 16 to sill 114, tampering with the screws is deterred.

Figure 12:
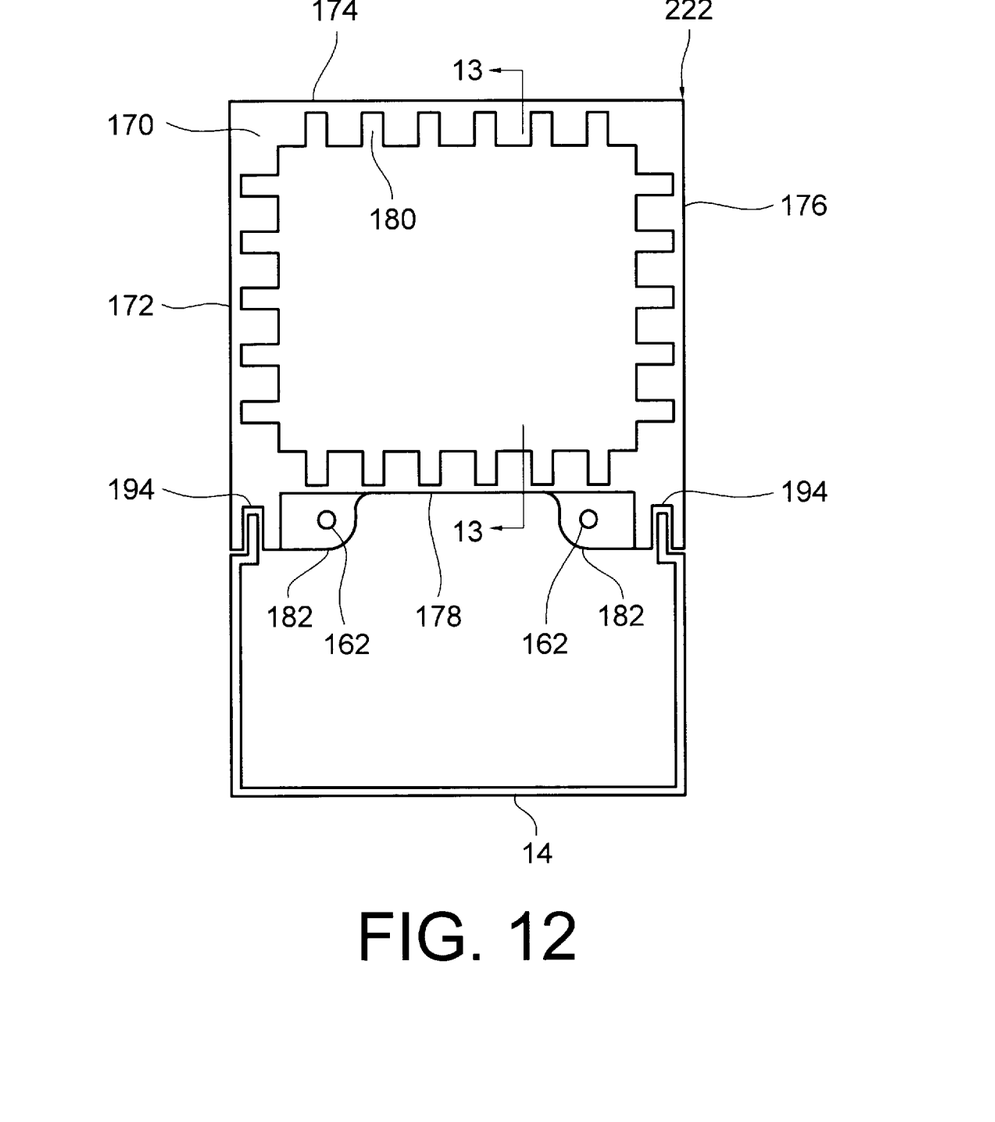
FIG. 12 is a plan view of a detachable molded pedestal with a traditional metal sill.
Figure 13:
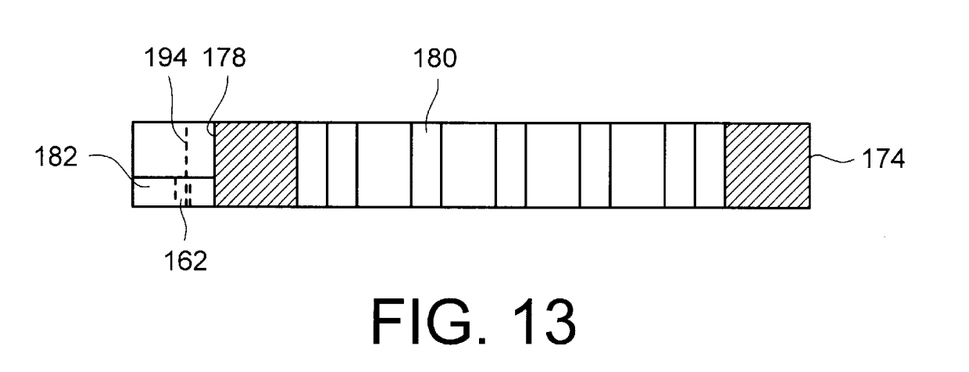
FIG. 13 is a cross sectional view taken along the lines 13—13 in FIG. 12.

FIGS. 12 and 13 show an alternative embodiment of a transformer pedestal, in which pedestal 222 is a separate, detachable component that is assembled between the transformer tank and the transformer pad. The detachable pedestal is preferably made of a material that combines adequate physical and chemical properties so as to provide sufficient strength and corrosion resistance. Suitable materials include, but are not limited to, polymers and epoxies. Various manufacturing processes such as molding, casting, machining or the like can be used, depending on the material selected.

The detachable pedestal 222 is generally rectangular, having four side sections 172, 174, 176, and 178. Pedestal 222 is anchored in place using machine screws and associated hardware inserted through brackets at the lower edge of the transformer tank front plate, holes 162 in the pedestal flanges 182, and traditional mounting holes in the transformer pad. Pedestal 222 preferably has molded slots 194 in side section 178 that accept a traditional metal sill 14. Engagement of the L-shaped form at the ends of the sill 14 with slots 194 provides a barrier to the insertion of foreign objects into the transformer cabinet along this interface. It will be understood that pedestal shapes other than rectangular can be used, as long as they provide adequate support for the transformer tank and barriers to the insertion of wire, pry bars, or other foreign objects into the transformer cabinet.

The detachable pedestal 222 provides the same improvement in corrosion resistance that the integral pedestal 122 does. An additional benefit it provides is flexibility. Because the pedestal is not formed as part of the pad, several different size transformer tanks and pedestals can be attached to the same size transformer pad. The detachable pedestal preferably incorporates the same features as the integral pedestal, namely, flat outer surfaces and molded support ribs 180. Molded-in or externally attached reinforcements can be used in conjunction with pedestal 222 for additional transformer tank support. As above, the height of detachable pedestal 222 is preferably between 0.5 inches and 6.0 inches and more preferably between 2 and 6 inches.

Figure 14:
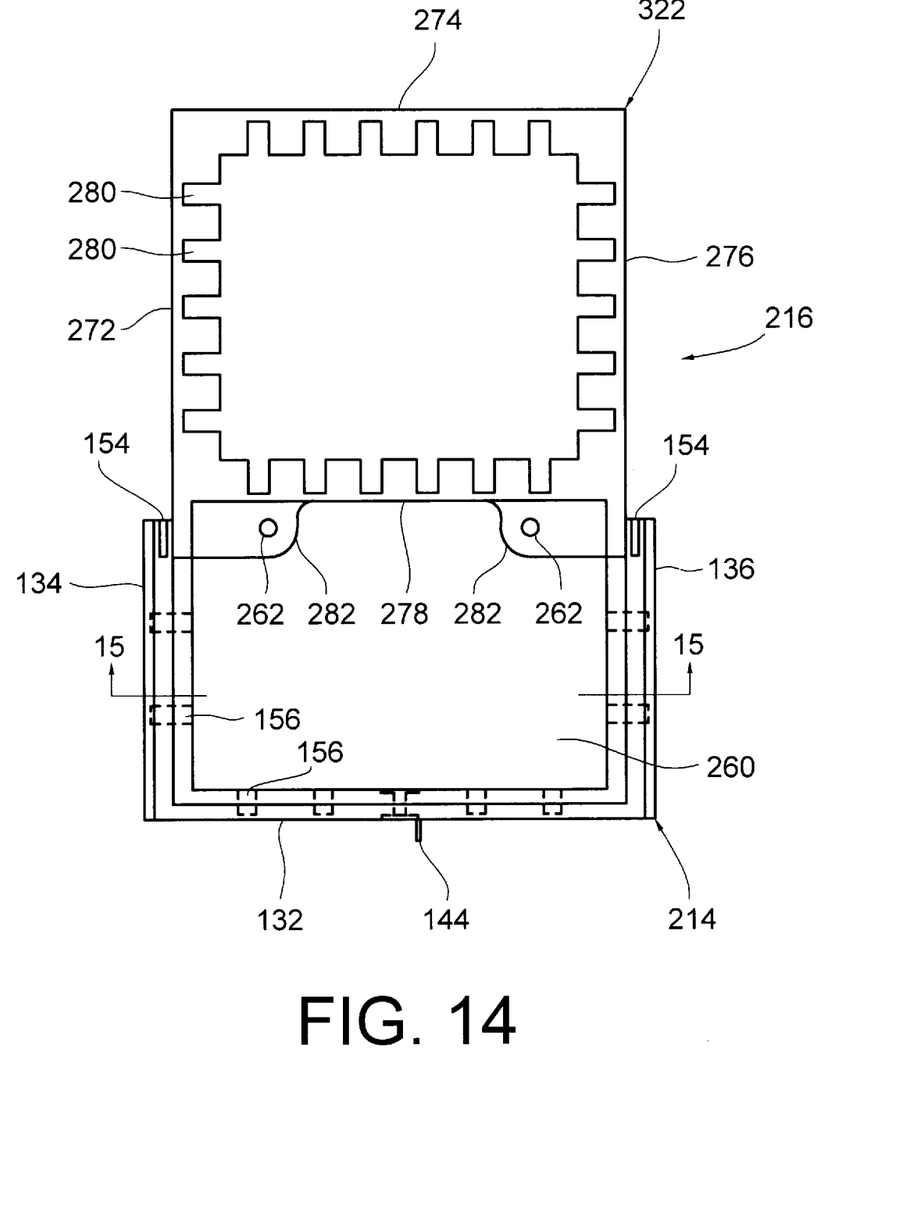
FIG. 14 is a plan view of a detachable, molded pedestal and sill.
Figure 15:
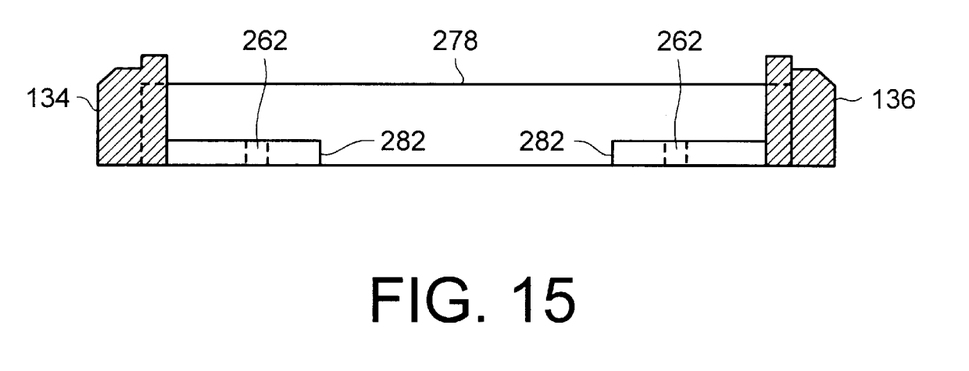
FIG. 15 is a cross sectional view along the lines 15—15 in FIG. 14.

FIGS. 14 and 15 show another alternative embodiment to a transformer pad, in which the detachable pedestal 322 and a detachable sill 214 form a single detachable component 216 that is separate from the transformer pad. The pedestal 322 and sill 214 are preferably made of a material combining adequate physical and chemical properties so as to provide adequate strength and corrosion resistance. Materials such as, but not limited to, polymers and epoxies could be employed. Any suitable manufacturing process, such as molding, casting, machining or the like, can be used, depending on the material selected. The detachable pedestal-sill 216 is attached to the transformer pad in a manner similar to that described above with respect to the detachable pedestal 222, using holes 262 in flanges 282. The detachable sill 214 preferably incorporates all of the transformer tank and cabinet door interface features of the integral sill and is governed by the same height constraints. Sill 214 is integral with and extends from section 278 of the pedestal and surrounds opening 260. Pedestal 322 can incorporate support ribs 280 and molded-in or external reinforcements for transformer tank support as described above. The height of the pedestal 322 is preferably between 0.5 inches and 6.0 inches and more preferably between 2 and 6 inches.

The detachable pedestal-sill 216 provides the same flexibility benefits as the detachable pedestal 222 and provides corrosion resistance improvements similar to the integral pedestal and sill. The detachable molded sill 214 provides improved tamper resistance at the cabinet door interface in comparison to the metal sill, but does not eliminate tampering at the transformer pad and sill interface as does the integral sill.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of the protection is not limited to the embodiments described herein, but is only limited by the claims which follow, the scope of which shall include all equivalents of the subject matter of the claims.

What is claimed is:

1. A device for supporting a transformer, comprising:
   a pad having front and rear surfaces left and right surfaces, and top and bottom surfaces; and
   a sill included on said top surface, the sill including means for supporting a transformer tank cabinet door above the top surface of the pad, said sill being formed integrally with said pad;
   said pad including a first opening capable of allowing passage therethrough of electrical cables for connecting the transformer to a power grid, said opening being positioned so that said cables are accessible when the transformer is in place on said pad.

2. The device according to claim 1 wherein said sill includes a front section, and left and right side sections.

3. The device according to claim 2 wherein said front and side sections include a shoulder and adjacent wall extending along all of said sections; said shoulder and said wall supporting the transformer cabinet door when the door is closed.

4. The device according to claim 3 wherein said side sections include vertical slots opposite said front section for engaging a transformer tank.

5. The device according to claim 4 wherein said sill extends between about 0.5 and 6 inches above said top surface of said body.

6. The device according to claim 2 wherein said pad and said sill are comprised of a molded polymer.

7. The device according to claim 6 wherein said sill includes a locking device for a cabinet door molded into said sill.

8. The device according to claim 7 wherein said front and side sections include molded in ribs for providing mechanical strength and reinforcement.

9. The device according to claim 7 wherein said sill includes an insert molded into said sill for mechanical strength and reinforcement.

10. The device according to claim 2 wherein said sill includes a locking device for a cabinet door mechanically fastened to said sill and a window through said sill to access said locking device.

11. The device according to claim 2 wherein said sill includes a locking device for a cabinet door retained in a pocket formed into said sill and a window through said sill to access said locking device.

12. The device according to claim 2 wherein said sill includes an insert mechanically fastened to said sill for mechanical strength and reinforcement.

13. A transformer system comprising a transformer tank cabinet door attached to a transformer tank both supported upon the device of claim 1.

14. A device for supporting a transformer, comprising:
   a pad having front and rear surfaces left and right surfaces, and top and bottom surfaces;
   a pedestal having a pedestal surface elevated above said top surface of said pad and including means for supporting a transformer tank above the top surface of said pad, said pedestal being integral with said pad; and
   said pad including a first opening capable of allowing passage therethrough of electrical cables for connecting the transformer to a power grid, said opening being positioned so that said cables are accessible when the transformer is in place on said pad.

15. The device according to claim 14 wherein said pedestal comprises two pairs of side sections that define a substantially flat pedestal surface.

16. The device according to claim 15 wherein one of said sides sections is positioned adjacent said opening in the pad, said one side section including a pair of mounting flanges to which the transformer tank can be attached.

17. The device according to claim 16 wherein said pedestal includes an insert for mechanical strength and reinforcement.

18. The device according to claim 17 wherein said pedestal extends between about 2 and 6 inches above said top surface of said pad.

19. The device according to claim 15 wherein said pad and said pedestal are comprised of a molded polymer.

20. The device according to claim 19 wherein said side sections include molded-in ribs for mechanical strength and reinforcement.

21. The device according to claim 19 wherein said pedestal includes an insert molded into said pedestal for mechanical strength and reinforcement.

22. A transformer system comprising a transformer tank supported upon the device of claim 14.

23. A device for supporting a tranformer, comprising:

pad having front and rear surfaces left and right surfaces, and top and bottom surfaces;

said pad including a first opening capable of allowing passage there through of electrical cables for connecting the transformer to a power grid, said opening being positioned so that access to said cables is provided when the transformer is in place on said pad;

said pad including a second drain opening sized to provide drainage for a portion of said top surface that is under the transformer when the transformer is in place on said device;

said top surface including at least one peripheral canted surface that is canted and extends to an outer perimeter of the pad so as to drain toward the outer perimeter of said pad and at least one interior canted surface that is canted to drain toward said second opening; and said device further comprises a pedestal having a pedestal surface elevated above said top surface and including means for supporting a transformer tank above said top surface of said pad.

24. The device according to claim 23 further including a sill adapted to engage a transformer tank cabinet door, said sill being formed integrally with said pad.

25. The device according to claim 24 wherein said sill includes a front section and left and right sections from which said peripheral canted surfaces extend outward.

26. The device according to claim 23, further including a pedestal adapted to support the transformer tank, said pedestal being integral with said pad.

27. The device according to claim 26 wherein said pedestal comprises two pairs of side sections from which said peripheral canted surfaces extend outward and said interior canted surfaces extend toward said second opening.

28. A transformer system comprising a transformer tank and a device for supporting said transformer tank, said device comprising a pad having an upper surface wherein said transformer tank is supported at a position elevated above said upper surface by a pedestal, said pedestal being separate from said pad and separate from said tank.

29. The transformer system according to claim 28 wherein said pedestal comprises two pairs of side sections that define a substantially flat pedestal surface.

30. The transformer system according to claim 29 wherein one of said side sections is positioned adjacent an opening in said pad that is adapted to allow the passage of cables therethrough, said one side section including a pair of mounting flanges through which the transformer can be attached to said pad.

31. The transformer system according to claim 30 wherein said side section has a sill extending therefrom and surrounding said opening.

32. The transformer system according to claim 31 wherein said sill includes a locking device for a cabinet door mechanically fastened to said sill.

33. The transformer system according to claim 31 wherein said pedestal and said sill are comprised of a molded polymer.

34. The transformer system according to claim 33 wherein said side sections of said pedestal include molded-in ribs for mechanical strength and reinforcement.

35. The transformer pad according to claim 33 wherein said pedestal includes an insert molded into said pedestal for mechanical strength and reinforcement.

36. The transformer system according to claim 33 wherein said sill includes a locking device for a cabinet door molded into said sill.

37. A device for supporting a transformer, comprising:

a pad having front and rear surfaces left and right surfaces, and top and bottom surfaces; and a sill included on said top surface, the sill including means for supporting a transformer tank cabinet door above the top surface of the pad, said sill being formed integrally with said pad, said sill including a front section and left and right side sections, said side sections each having a vertical slot opposite said front section for engaging a transformer tank;

said pad including a first opening capable of allowing passage there through of electrical cables for connecting the transformer to a power grid, said opening being positioned so that said cables are accessible when the transformer is in place on said pad.

* * * * *